US007921712B1

(12) United States Patent
Rindler et al.

(10) Patent No.: US 7,921,712 B1
(45) Date of Patent: Apr. 12, 2011

(54) DYNAMOMETER TEST APPARATUS AND METHOD FOR TESTING BOTH TRANSMISSIONS AND REAR DIFFERENTIALS

(75) Inventors: Dean M. Rindler, Troy, OH (US); Steven Bray, St. Paul, MN (US)

(73) Assignee: Honda Motor Co., Ltd., Tokyo (JP)

( * ) Notice: Subject to any disclaimer, the term of this patent is extended or adjusted under 35 U.S.C. 154(b) by 262 days.

(21) Appl. No.: 12/179,117

(22) Filed: Jul. 24, 2008

(51) Int. Cl.
*G01L 3/04* (2006.01)

(52) U.S. Cl. .................................. 73/116.06; 73/116.05

(58) Field of Classification Search ............... 73/115.02, 73/115.05, 115.06, 116.06, 116.01
See application file for complete search history.

(56) References Cited

U.S. PATENT DOCUMENTS

| | | | |
|---|---|---|---|
| 3,363,455 A * | 1/1968 | Vanderbilt, Jr. ............ | 73/115.06 |
| 3,712,127 A | 1/1973 | Petersen | |
| 4,062,234 A * | 12/1977 | Bartlett et al. ............. | 73/862.11 |
| 4,391,131 A | 7/1983 | Scourtes | |
| 4,489,597 A | 12/1984 | Davison, Jr. | |
| 4,898,026 A * | 2/1990 | Damitz ...................... | 73/115.06 |
| 4,920,788 A * | 5/1990 | Ando et al. ................ | 73/115.02 |
| 4,939,985 A * | 7/1990 | Von Thun .................. | 73/116.01 |
| 5,086,648 A | 2/1992 | Sano et al. | |
| 5,144,834 A | 9/1992 | Sano et al. | |
| 5,189,908 A | 3/1993 | Sano et al. | |
| 5,209,110 A | 5/1993 | Sano et al. | |
| 5,323,644 A | 6/1994 | Schaefer | |
| 5,537,865 A * | 7/1996 | Shultz ........................ | 73/115.02 |
| 5,760,302 A * | 6/1998 | Moradi et al. .................. | 73/462 |
| 6,189,376 B1 * | 2/2001 | Shock et al. ............... | 73/116.01 |
| 6,345,529 B1 * | 2/2002 | Eskilson .................... | 73/115.02 |
| 6,389,888 B1 * | 5/2002 | Juranitch et al. .......... | 73/116.01 |
| 7,104,118 B2 * | 9/2006 | Tentrup et al. ............. | 73/116.06 |
| 7,530,263 B2 * | 5/2009 | Sowle ........................ | 73/118.01 |
| 7,712,358 B2 * | 5/2010 | Kingsbury et al. ........ | 73/115.06 |
| 2008/0173101 A1 * | 7/2008 | Sowle ........................ | 73/862.09 |

* cited by examiner

*Primary Examiner* — Freddie Kirkland, III
(74) *Attorney, Agent, or Firm* — Rankin Hill & Clark LLP

(57) ABSTRACT

A dynamometer-based test apparatus that includes a driving dynamometer which is rotatable between first and second positions thus allowing attachment to either a vehicle transmission from a vehicle having a transverse engine/transmission configuration or directly to a vehicle propeller shaft and a first vertically adjustable absorption dynamometer attachable to a first output drive shaft from a vehicle differential and a second vertically adjustable absorption dynamometer attachable to a second output drive shaft from a vehicle differential. A hand held rotating device such as a drill is attached to a gear and used to rotate the platform supporting the drive dynamometer and is attached to different jack screws to move that platform linearly, a base beneath the platform linearly and the absorption dynamometers vertically.

16 Claims, 6 Drawing Sheets

DYNAMOMETER TEST APPARATUS AND METHOD FOR TESTING BOTH TRANSMISSIONS AND REAR DIFFERENTIALS

BACKGROUND OF THE INVENTION

Dynamometers have been used extensively for measuring speed and torque from power sources such as engines or motors that have a rotating output shaft. Dynamometers, alternatively, have also been used to determine the torque and power required to operate a device commonly powered by an engine or motor.

In the area of automobile testing, dynamometers have been used to measure the output from engines as well as the requirements of driven components, such as transmissions and differentials. One common testing configuration is shown in U.S. Pat. No. 3,330,153 to Perna Jr. wherein an engine, via a transmission, drives a differential. A first dynamometer is coupled to an output half axle extending from a first side of the differential. Similarly, a second dynamometer is coupled to an output half axle extending from a second, opposite, side of the dynamometer.

In operation, each dynamometer reads the speed and torque from the respective rotating differential output shafts while the engine is operating. Additionally, the dynamometers can selectively be loaded with resistance to simulate varying driving conditions, such as driving around a curve.

As dynamometers are generally costly items, flexibility in the use of a dynamometer for multiple tests is desired. As described above, a single dynamometer can have a loads applied thereto to simulate many different driving conditions. Additionally, dynamometers are made that can act both as a driving dynamometer (simulating a driving device: motor or engine) and an absorption dynamometer (simulating a driven device). Even more flexibility is desired, however.

In vehicle testing, dynamometers used are relatively large (typically heavier than one ton) and, thus, are placed in a single position, movable at most linearly to and/or away from a shaft that the output of the dynamometer is coupled to; that shaft extending from the device being tested. However, within a single vehicle or vehicle configuration, it may be desirable to test vehicle components singularly, or that are located in significantly different positions, such as the differential alone or in combination with a transverse mount vehicle transmission, each testing scenario requiring a different configuration.

What is desired is a testing setup using multiple dynamometers (driving and absorption) where the position of the dynamometers can be easily and significantly changed.

BRIEF SUMMARY OF THE INVENTION

A dynamometer-based test apparatus is provided that includes a driving dynamometer, on a platform, which is rotatable between first and second positions, thus allowing driving of a vehicle transmission from a vehicle having a transverse engine/transmission configuration and a differential or a differential alone. The apparatus also includes a first vertically adjustable absorption dynamometer attachable to a first output drive shaft from the vehicle differential and a second vertically adjustable absorption dynamometer attachable to a second output drive shaft from a vehicle differential. A hand held rotating device such as a drill is attached to a gear and used to rotate the platform supporting the drive dynamometer. A hand held drill and jack screws may also be used to linearly move a base plate supporting the platform, and to vertically move tables supporting the absorption dynamometers, as required.

These and other features, aspects and advantages of the present invention will be fully described by the following description, appended claims and accompanying drawings.

DETAILED DESCRIPTION OF THE INVENTION

Figure 1:
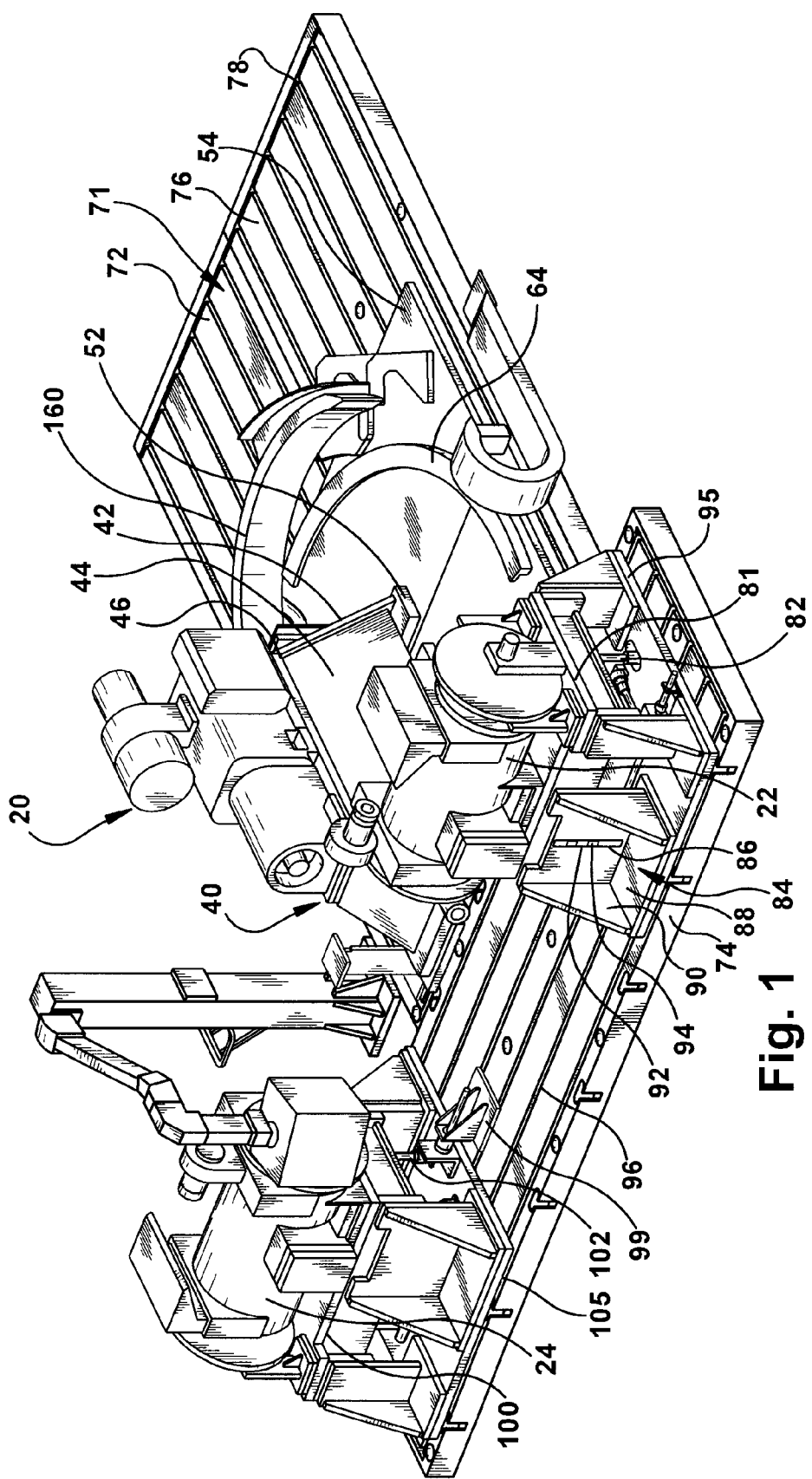
FIG. 1 is a perspective view of the components of a testing setup.
Figure 2:
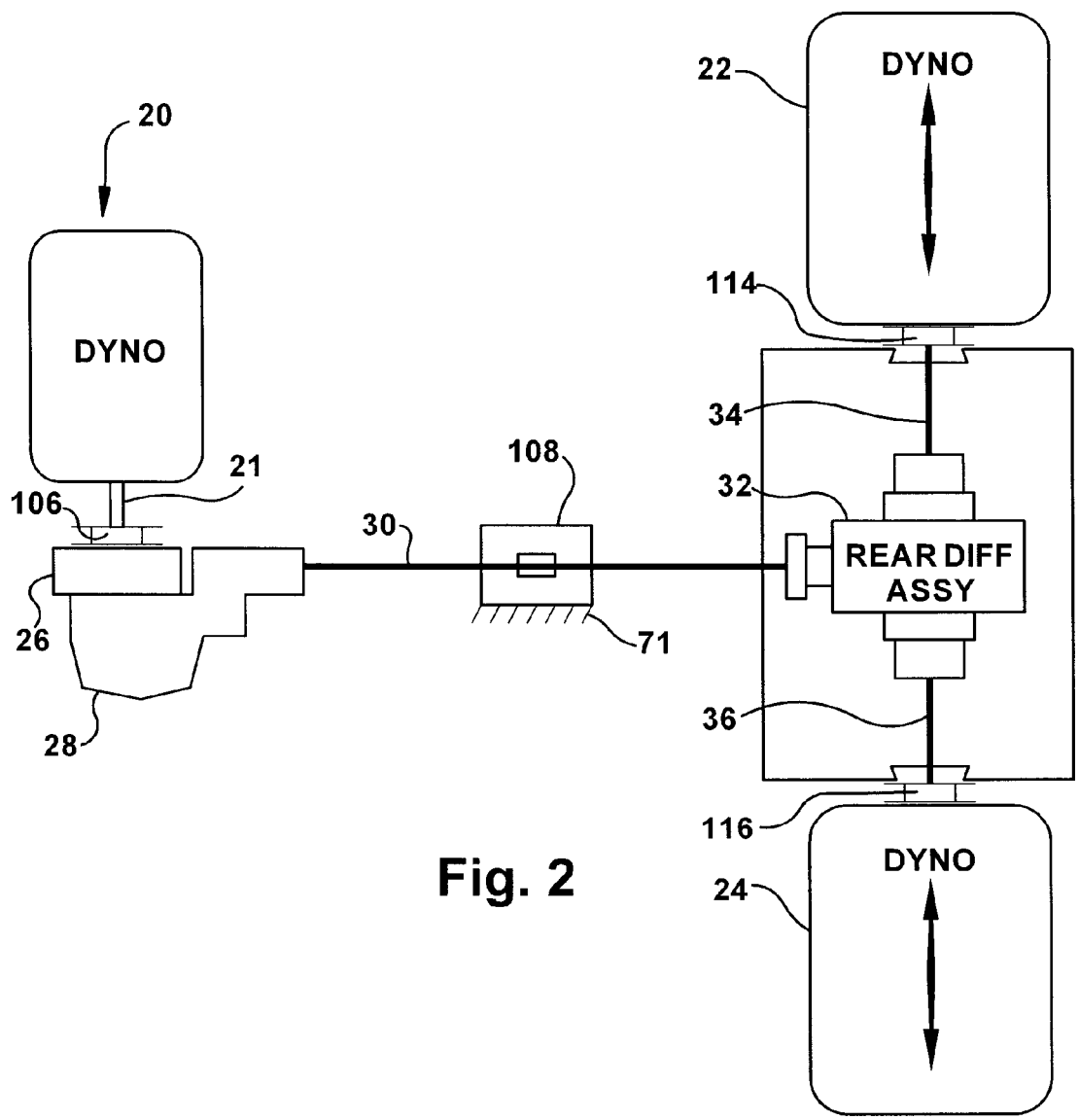
FIG. 2 is a schematic top view of a first testing configuration including a vehicle transmission and differential.
Figure 3:
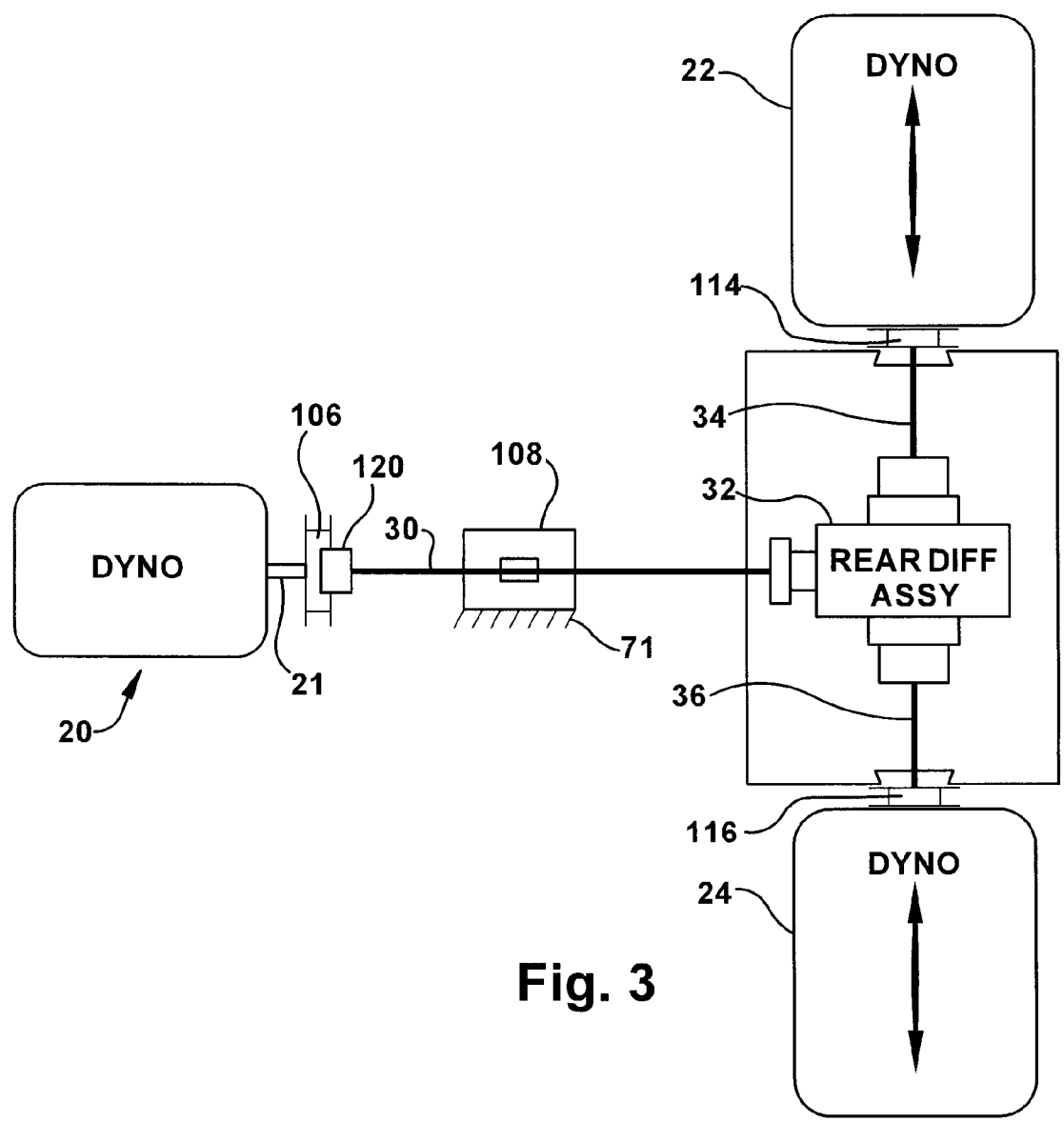
FIG. 3 is a schematic top view of a second testing configuration including a differential.

Referring to the drawings, specifically FIGS. 1 and 2, a preferred testing setup is illustrated. The elements within the setup include a driving dynamometer 20, a first absorption dynamometer 22 and a second absorption dynamometer 24. In a first, preferred embodiment, the vehicle being tested includes a torque converter 26, transmission 28, propeller shaft 30, rear differential assembly 32 and drive shafts 34 and 36 extending from each side of the rear differential assembly 32 (shown only in FIG. 2). An alternative testing configuration, not including the transmission and torque converter, is shown in FIG. 3 and described later.

The driving dynamometer 20 includes means to provide any speed and torque desired to drive a vehicle transmission 28 and/or differential 32. The absorption dynamometers 22 and 24 include shafts that are freely rotatable and include means for measuring speed and torque. The absorption dynamometers 22 and 24 also can be varied to increase rotational resistance in a manner well known in the art. The driving dynamometer 20 is of a type known in the art such as those manufactured by General Electric and includes an output shaft 21.

Figure 4A:
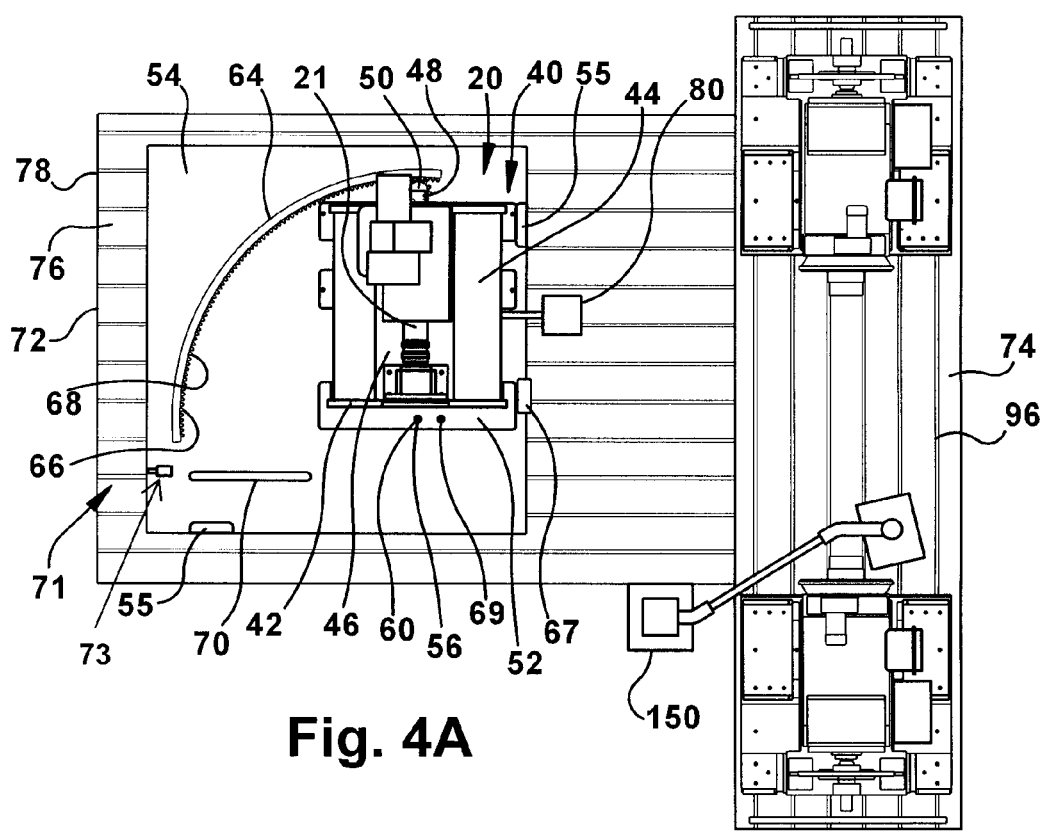
FIG. 4A is a top view of a first position of the driving dynamometer within a setup without showing the transmission or differential.

Referring to FIGS. 1 and 4A, the driving dynamometer 20 is supported on a platform 40. The platform 40 includes two trapezoidal end plates 42, and two angled side plates 44, each extending from one end plate 42 to the other. A flat, horizontal top plate 46 extends from the top of one end plate 42 to the top of the other end plate 42. A shaft 48 is secured to the platform 40 and includes an associated gear 50 that rotates thereon. Preferably, the side plates 44 and end plates 42 are supported on a series of cross members 52 that have friction reducing pads on their bottom sides. The cross members 52 are supported on a large base plate 54. The cross member 52 located near the output shaft 21 of the driving dynamometer 20 includes an aperture 56 therein. A removable pin 60 is attachable to the base plate 54 and when attached protrudes through the aperture 56 and as a result the entire platform 40 may be spun about the pin 60 as described in more detail below. The pin 60 may be selectively removed from within the aperture 56 of the cross member, preferably by hand, when linear movement of the platform 40 relative to the base plate 54 is desired.

An arcuate toothed track 64 is also supported on the base plate 54. The track's length is approximately one quarter of a full circle. Teeth 66 are provided on the concave side 68 of the track 64. The toothed track 64 is positioned such that the platform 40 can be moved, linearly, to a position in which the teeth on the gear 50 mesh with the teeth 66 on the track 64 (compare FIGS. 4C and 4D). When the gear 50 meshes with the track teeth 66 and the gear 50 is turned, the gear 50 moves along the toothed track 64, thus rotating the platform 40 and the driving dynamometer 20 supported thereon with respect to the base plate 54. Contact with a stop plate 55 indicates when rotation of the platform is complete in either direction. A plunger stop 73 is provided to limit motion of the platform 40 in a rearward direction.

Figure 4B:
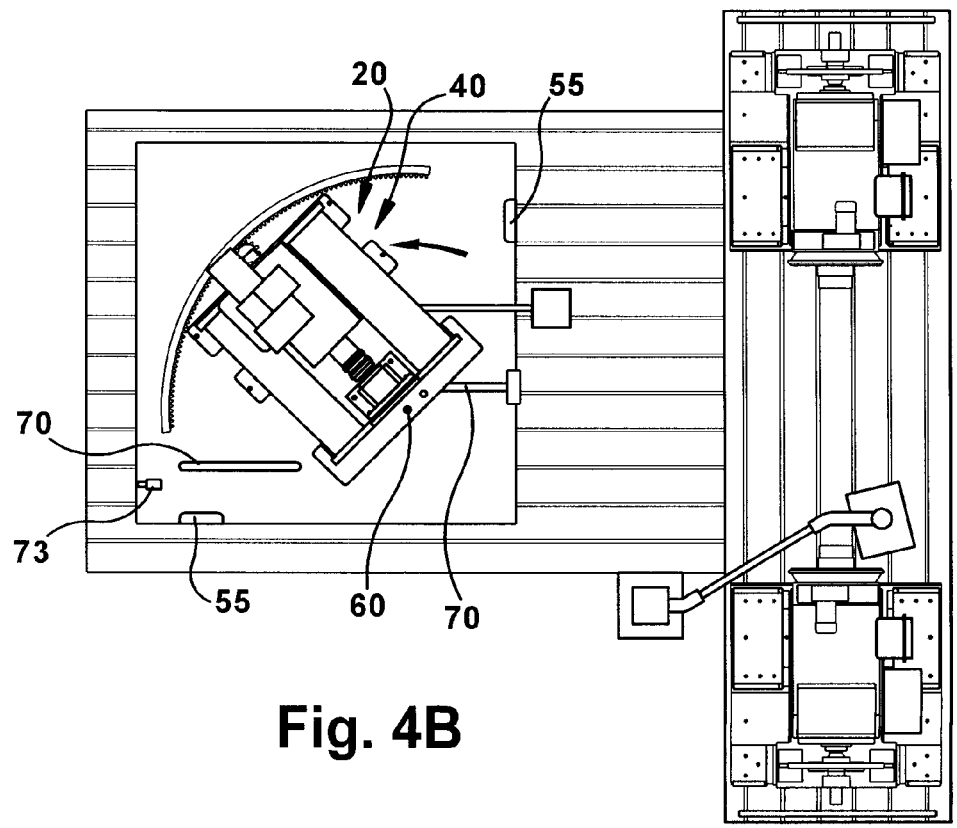
FIG. 4B is a top view of a second position of the driving dynamometer within a setup without showing the transmission or differential.
Figure 4C:
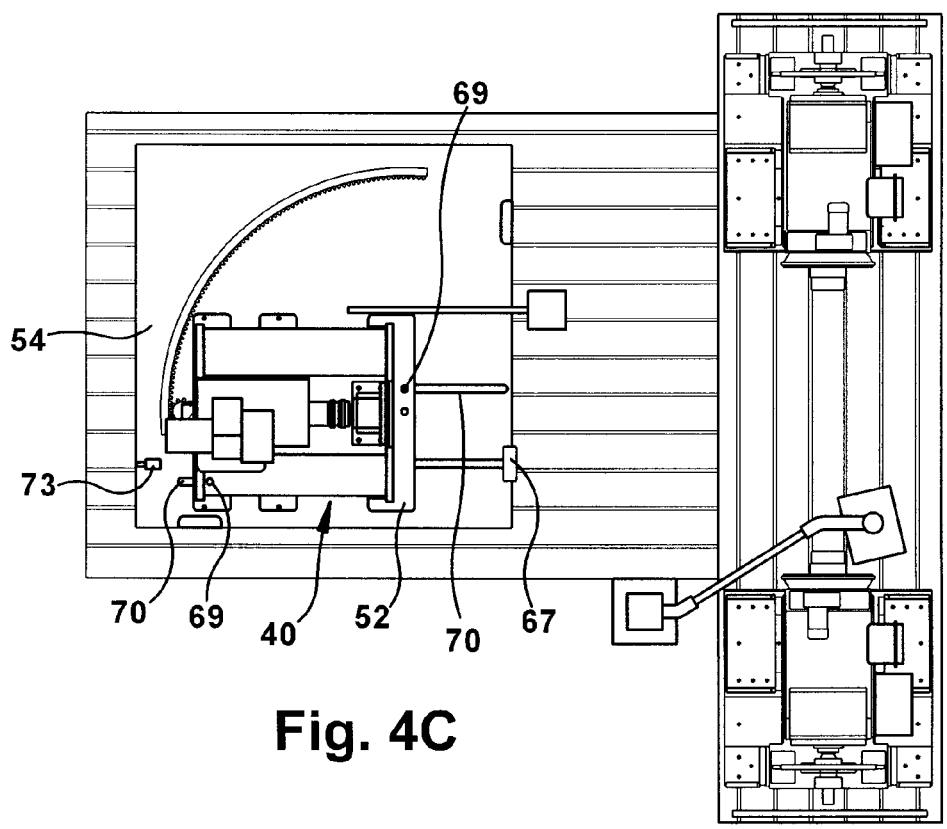
FIG. 4C is a top view of a third position of the driving dynamometer within a setup without showing the transmission or differential.
Figure 4D:
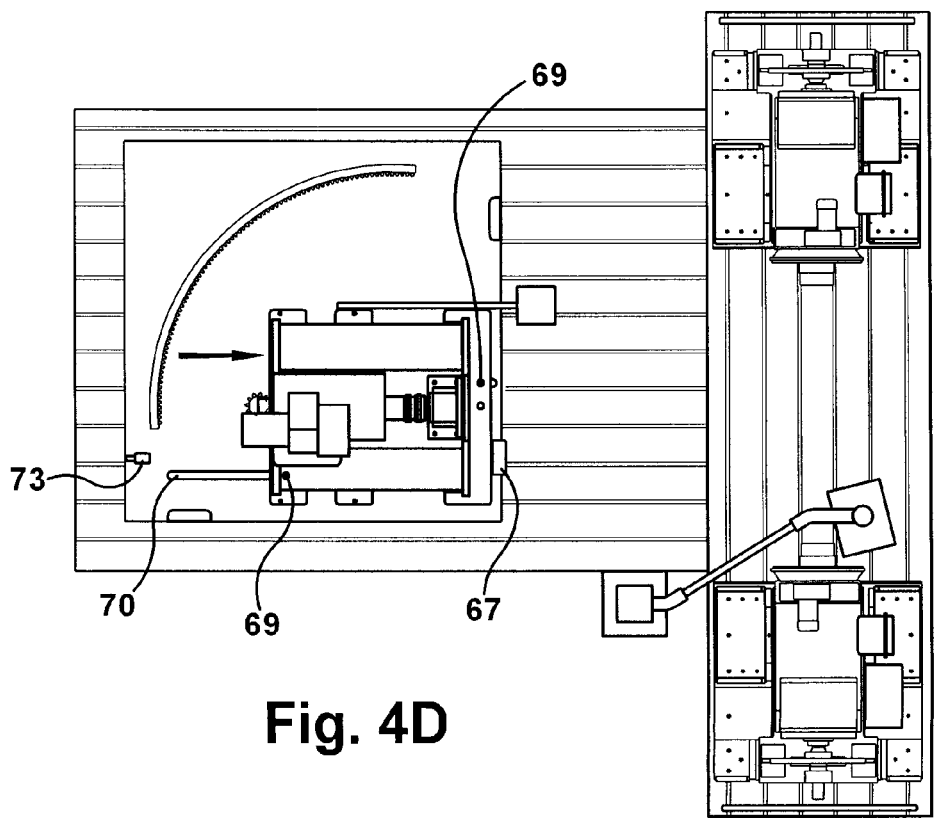
FIG. 4D is a top view of a fourth position of the driving dynamometer within a setup without showing the transmission or differential.
Figure 4E:
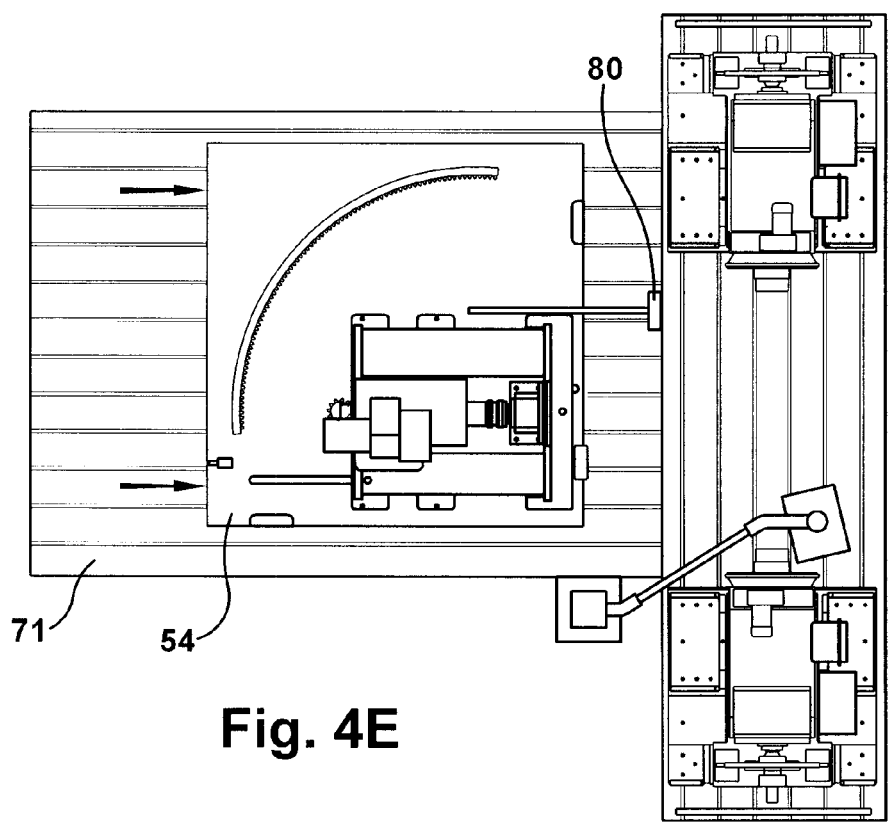
FIG. 4E is a top view of a fifth position of the driving dynamometer within a setup without showing the transmission or differential.
Figure 4F:
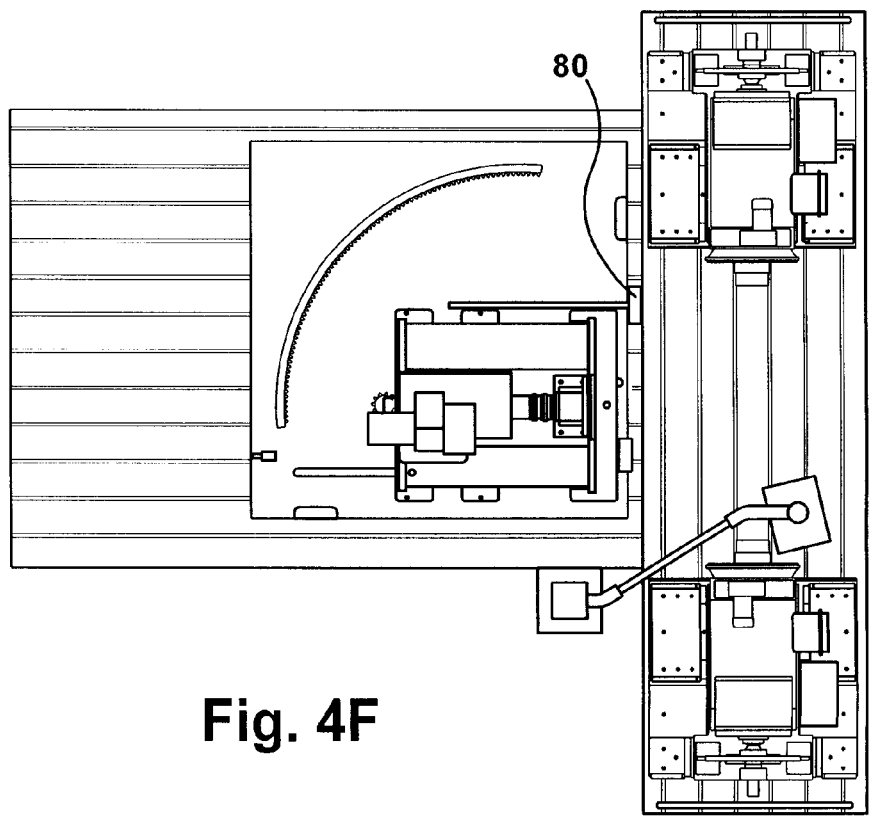
FIG. 4F is a top view of a sixth position of the driving dynamometer within a setup without showing the transmission or differential.

Referring to FIGS. 4C and 4D, linear movement of the platform 40 with respect to the base plate 54 is provided by first disengaging the pin 60 from the base plate 54 through the cross member 52 of the platform 40. Second pins 69 are then placed through the platform 40 and extend into grooves 70 within the base plate 54. The second pins 69 are movable within the grooves 70 in a direction parallel to the vehicle propeller shaft 30 when in place within the setup. A jackscrew and rod combination 67 is attached to the base plate 54 and is used to move the platform 40.

Referring back to FIGS. 1, 2 and 4A, the base plate 54 is supported on a floor 71 that has a surface area larger than the base plate 54. The floor 71 has a first section 72 and a second section 74 that abut one another in a transverse configuration. The first section 72 has a top surface 76, and a number of channels 78, also referred to as T-slots, are provided within this top surface 76. T-slot nuts and bolts secure the underside of the base plate 54 to the floor 71. The channels 78 are parallel to the propeller shaft 30 that extends between the transmission 28 and differential 32 in the setup. Thus, the base plate 54 as well as the platform 40 and driving dynamometer 20 supported thereon can be translated toward or away from the vehicle differential 32. A jack screw and rod combination 80 is used to move the base plate 54 with respect to the floor 71.

The first absorption dynamometer 22 is supported on the second section 74 of the floor 71. A support table 81 beneath the absorption dynamometer 22 is raised by four jack screws 82 that are connected to a single input drive. Four side supports 84 are associated with the elevating table 81 and each side support 84 includes a vertical plate 86 and a horizontal plate 88 and one or more gussets 90 that maintain the vertical and horizontal plates in a perpendicular relationship. Each vertical plate 86 may include a vertical slot 92 therein. One or more bolts 94 protruding from the sides of the elevating table 81 fit within each slot 92 (when present) and guide the vertical movement of the elevating table 81. This is shown on one plate 86 in FIG. 1, but may be provided on some or all of the remaining plates.

Additionally, the side supports 84 rest on an absorption dynamometer base plate 95. The absorption dynamometer base plate 95 rests on the second section 74 of the floor 71. This second section 74 includes channels 96 that are perpendicular to the channels 78 in the first section 72 of the floor. T-slot nuts and bolts are used to secure the base plate 95 to the floor 71. The channels 96 are oriented parallel to the drive axles 34 and 36 extending from each side of the differential 32 when the drive axles are placed in the setup. The absorption dynamometer base plate 95 can translate, preferably up to 10 inches in a direction parallel to the channels 96. This allows for accommodation of various vehicle track widths and easy disconnection of each absorption dynamometer 22 and 24 from the differential 32 and removal of the vehicle differential 32. A jack screw 99 moves a base plate 95 with respect to the floor 74.

The second absorption dynamometer 24 is also supported in a similar manner on a second elevating table 100 which is raised via four jack screws 102 connected to a single input drive. The elevating table 100 rests on a base plate 105 on the second section 74 of the floor 71. Again, a jack screw 99 moves the base plate 105 with respect to the floor 74.

In a first configuration of the system, shown in FIG. 2, the vehicle components being tested include both the transmission 28 and the differential 32. The transmission 28 is bolted to the face of the driving end of the driving dynamometer 20 and the shaft 21 from the driving dynamometer 20 fits into the transmission 28, via the torque converter 26. The transmission 28 is a type used with a transverse mount engine and, thus, the driving dynamometer 20 is placed in a first orientation simulating a transverse mounted engine. The output shaft 21 of the driving dynamometer 20 is attached to a torque meter 106 and then to the torque converter 26. The torque converter 26 is bolted to the transmission 28. The propeller shaft 30 exits the transmission 28 in a direction toward the differential 32 and transverse to the output shaft 21 of the driving dynamometer 20.

The propeller shaft 30 is supported, approximately midway along its length, by a support piece 108, which is in turn supported on the floor 71 of the setup. The propeller shaft 30 is secured on one end to the transmission 28 and on the opposite end to the differential 32. The differential is supported by individual support stands (not shown). First and second drive shafts 34 and 36 extend from opposite sides of the differential 32 and extend toward where a wheel of the vehicle would be configured. Each drive shaft 34 and 36 is transverse to the propeller shaft 30. Each drive shaft 34 and 36 attaches to a torque meter 114 and 116 before connecting to either the first or second absorption dynamometer 22 and 24, respectively.

The only items that are required to be used from the vehicle are a drive plate (not illustrated), torque converter 26 (or clutch), transmission 28, transfer assembly 120, propeller shaft 30, rear differential 32, and rear drive shafts 34 and 36.

In a second configuration, shown in FIG. 3, the torque converter and transmission are removed. The driving dynamometer 20 is rotated 90 degrees such that the output shaft 21 of the driving dynamometer 20 is parallel to the propeller shaft 30. The manner of how this is done is described later. An adapter 120 is provided to allow the propeller shaft 30 to be connected to the output shaft 21 of the driving dynamometer 20. This configuration is considered to be a direct drive configuration because the transmission is not present. Typically in the second configuration, the differential 32 and the two absorption dynamometers 22 and 24 must be raised or lowered as compared to their position within the first configuration.

Referring to FIGS. 1 and 4A-4G, a method of reconfiguring the apparatus is shown. In FIG. 4A, a first configuration is shown, wherein the driving dynamometer 20 simulates a transverse mount engine. The configuration is shown without the transmission, propeller shaft, or differential in place. A sensor interface module 150 is used for data acquisition.

Using a hand held rotating device, such as a power drill, an operator rotates the gear 50. As the gear 50 is rotated, the entire platform 40 slowly rotates on the base plate 54. FIG. 4B shows the platform 40 and driving dynamometer 20 thereon rotated approximately forty five degrees. The platform rotates around pin 60 which is secured to the base plate 54. As the driving dynamometer 20 rotates, a flexible cable holder 160 which holds cables connected to the dynamometer 20 also shifts position, either overlapping itself or extending out of an overlapped state. The cable holder 160 rests upon a table for support.

Continued rotation of the gear 50 rotates the driving dynamometer 20 a full ninety degrees to a position shown in FIG. 4C. The pivot pin 60 is then removed and second pins 69 put into place, fitting into their respective channels 70 in the base plate 54. The platform 40 is moved on the base plate 54 using the jack screw and rod combination 67 to the positions shown from FIG. 4C to FIG. 4D.

Using a hand held drill or the like, the base plate 54 is then moved linearly with respect to the floor 71. The drill is applied to the jack screw and rod combination 80. Movement of the base plate 54 is shown from FIG. 4E to FIG. 4F. Alternatively, the order of moving the platform 40 and the base plate 54 may be reversed.

The height of the differential is set with respect to the transmission based on the proper propeller shaft 30 angle. The absorption dynamometers 22 and 24 are then vertically adjusted in order to properly align with the differential. Again, a hand held rotating device, such as a drill, is applied to an input drive which drives four jack screws 82 of each absorption dynamometer support and rotation of the jack screws 82 lifts or lowers a table supporting an absorption dynamometer, as desired, to appropriately align a new configuration. The absorption dynamometers are also moved linearly via jack screws 99 to align and be secured with the differential.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A reconfigurable dynamometer apparatus for testing vehicle components including at least a vehicle differential, the apparatus comprising:
    a base;
    a driving dynamometer which drives the vehicle components and is rotatable on the base between:
        a first position; and
        a second position wherein the components being tested also include a vehicle transmission from a vehicle having a transverse type engine and/or transmission configuration the transmission being in rotational communication with the differential;
    a first vertically displaceable absorption dynamometer driven by a first output shaft from the vehicle differential; and
    further comprising a pin that fits through an aperture in the driving dynamometer and into an aperture in the base to provide a rotation pivot point.

2. The apparatus of claim 1, wherein the first and second driving dynamometer positions are offset by 90 degrees.

3. The apparatus of claim 1, further comprising a second vertically displaceable absorption dynamometer driven by a second output shaft from the vehicle differential.

4. The test apparatus of claim 1, wherein the driving dynamometer is supported on a platform and the platform supported on the base such that the platform rotates relative to the base.

5. The apparatus of claim 4, wherein the platform is also linearly displaceable with respect to the base.

6. The apparatus of claim 1,
    wherein the driving dynamometer is supported on a platform and the platform supported on the base such that the platform rotates relative to the base;
    wherein the platform is also linearly displaceable with respect to the base; and
    further comprising pins which selectively fit through apertures in the platform into channels formed in an upper surface of the base to guide linear movement of the platform.

7. A reconfigurable dynamometer apparatus for testing vehicle components including at least a vehicle differential, the apparatus comprising:
    a base;
    a driving dynamometer which drives the vehicle components and is rotatable on the base between:
        a first position; and
        a second position wherein the components being tested also include a vehicle transmission from a vehicle having a transverse type engine and/or transmission configuration the transmission being in rotational communication with the differential; and
    a first vertically displaceable absorption dynamometer driven by a first output shaft from the vehicle differential;
    wherein a gear assembly is joined with the dynamometer such that both move together and an arcuate toothed rack is supported on the base wherein a gear in the gear assembly is meshable with the teeth on the rack and rotation of the gear rotates the driving dynamometer.

8. The apparatus of claim 7, wherein the driving dynamometer is supported on a platform and the platform supported on the base such that the platform rotates relative to the base and the gear assembly is also supported on the platform.

9. The apparatus of claim 7, wherein the first and second driving dynamometer positions are offset by 90 degrees.

10. The apparatus of claim 7, further comprising a second vertically displaceable absorption dynamometer driven by a second output shaft from the vehicle differential.

11. A reconfigurable dynamometer apparatus for testing vehicle components including at least vehicle differential, the apparatus comprising:
    a base;
    a driving dynamometer which drives the vehicle components and is rotatable on the base between:
        a first position; and
        a second position wherein the components being tested also include a vehicle transmission from a vehicle having a transverse type engine and/or transmission configuration the transmission being in rotational communication with the differential; and
    a first vertically displaceable absorption dynamometer driven by a first output shaft from the vehicle differential;
    wherein the driving dynamometer is supported on a platform and the platform supported on the base such that the platform rotates relative to the base;

wherein the platform is also linearly displaceable with respect to the base; and wherein the base is supported on a floor including linear channels with a T-shaped cross section and the base is linearly displaceable, utilizing T-slot nuts and bolts, with respect to the floor.

12. A method of testing a vehicle differential both in conjunction with and without an associated vehicle transmission comprising the steps of:

providing a driving dynamometer which drives the vehicle differential and transmission in a setup and is rotatable on a base between a first position and a second position, providing a first vertically displaceable absorption dynamometer driven by a first output shaft from the vehicle differential;

driving the transmission and differential using the driving dynamometer for testing purposes;

removing the transmission from the setup;

rotating the driving dynamometer ninety degrees into a direct drive configuration;

vertically realigning the absorption dynamometer; and driving the differential using the driving dynamometer for testing purposes.

13. The method of claim 12, further including the step of placing the driving dynamometer upon a platform and the platform on the base where the platform is linearly movable with respect to the base after placing pins through apertures in the platform into channels in the base.

14. The method of claim 12, further including the step of placing the driving dynamometer on a platform and the platform on the base and placing a single pin through an aperture in the platform into an aperture in the base to allow rotational movement of the driving dynamometer about the single pin.

15. The method of claim 12, further including the step of placing the driving dynamometer on a platform and the platform on the base, wherein the platform includes a gear and the base an arcuate toothed track, and wherein rotation of the driving dynamometer occurs by rotating the gear while it is meshed with the arcuate track.

16. The method of claim 12, further including the steps of:

placing the driving dynamometer on a platform and the platform on the base, wherein the platform includes a gear and the base an arcuate toothed track, and wherein rotation of the driving dynamometer occurs by rotating the gear while it is meshed with the arcuate track;

placing the base on a floor including grooves and providing the base with bolts that protrude from a bottom side of the base and fit in the grooves and moving the base linearly with respect to the floor to position the driving dynamometer; and moving the platform linearly with respect to the base after placing pins through apertures in the platform into channels in the base.

* * * * *